Oct. 24, 1967  E. G. CURTIS  3,348,356
METHOD OF COVERING A TRAYLESS PACKAGE WITH
HEAT SHRINKABLE PLASTIC FILM
Filed Nov. 13, 1963  5 Sheets-Sheet 1

INVENTOR.
Edward G. Curtis
BY
Dominik, Rudy & Stein
Jerome Cadix  Att'ys.

Oct. 24, 1967    E. G. CURTIS    3,348,356
METHOD OF COVERING A TRAYLESS PACKAGE WITH
HEAT SHRINKABLE PLASTIC FILM
Filed Nov. 13, 1963    5 Sheets-Sheet 2
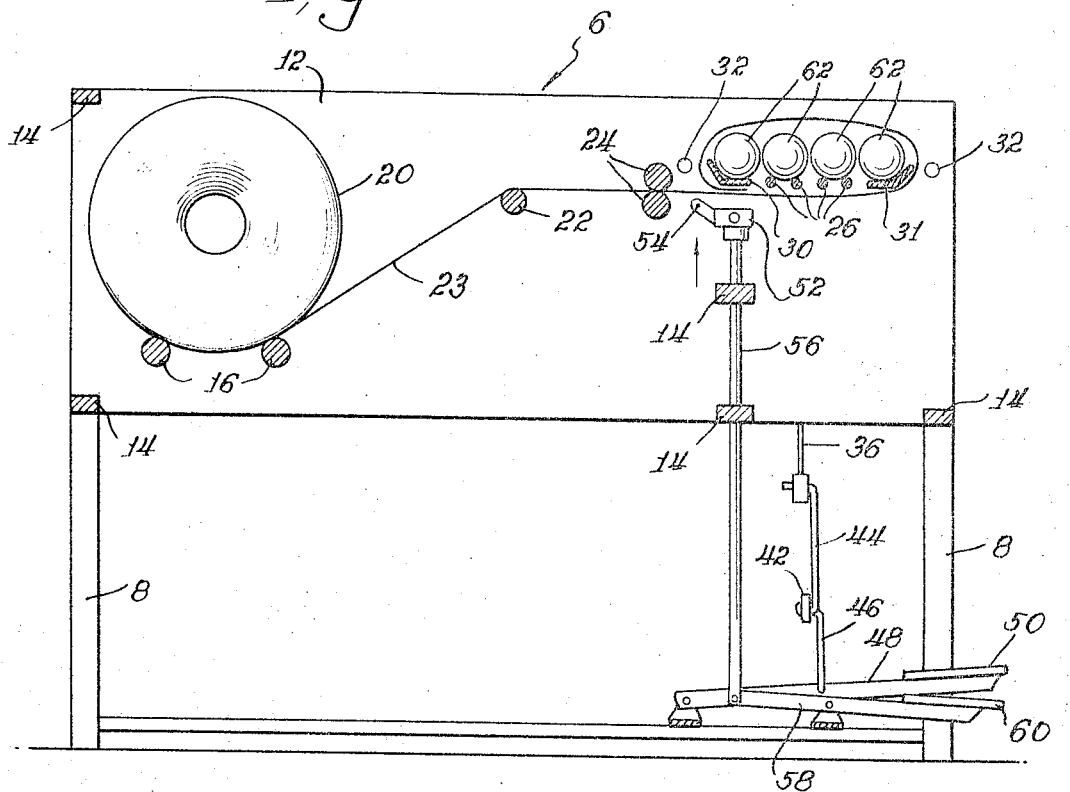
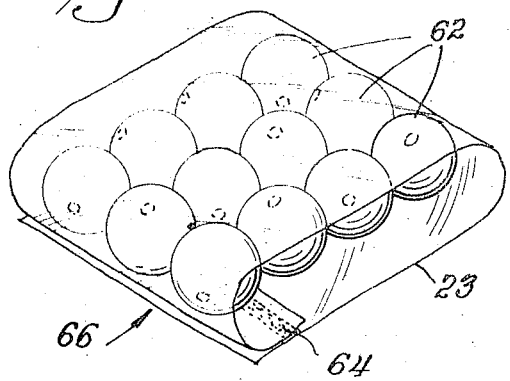
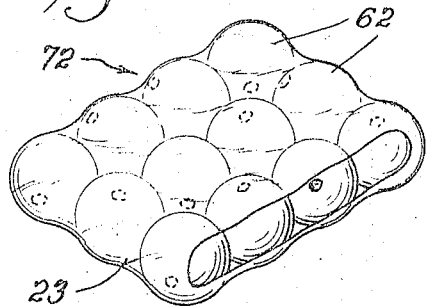
INVENTOR.
Edward G. Curtis
BY
Att'ys.

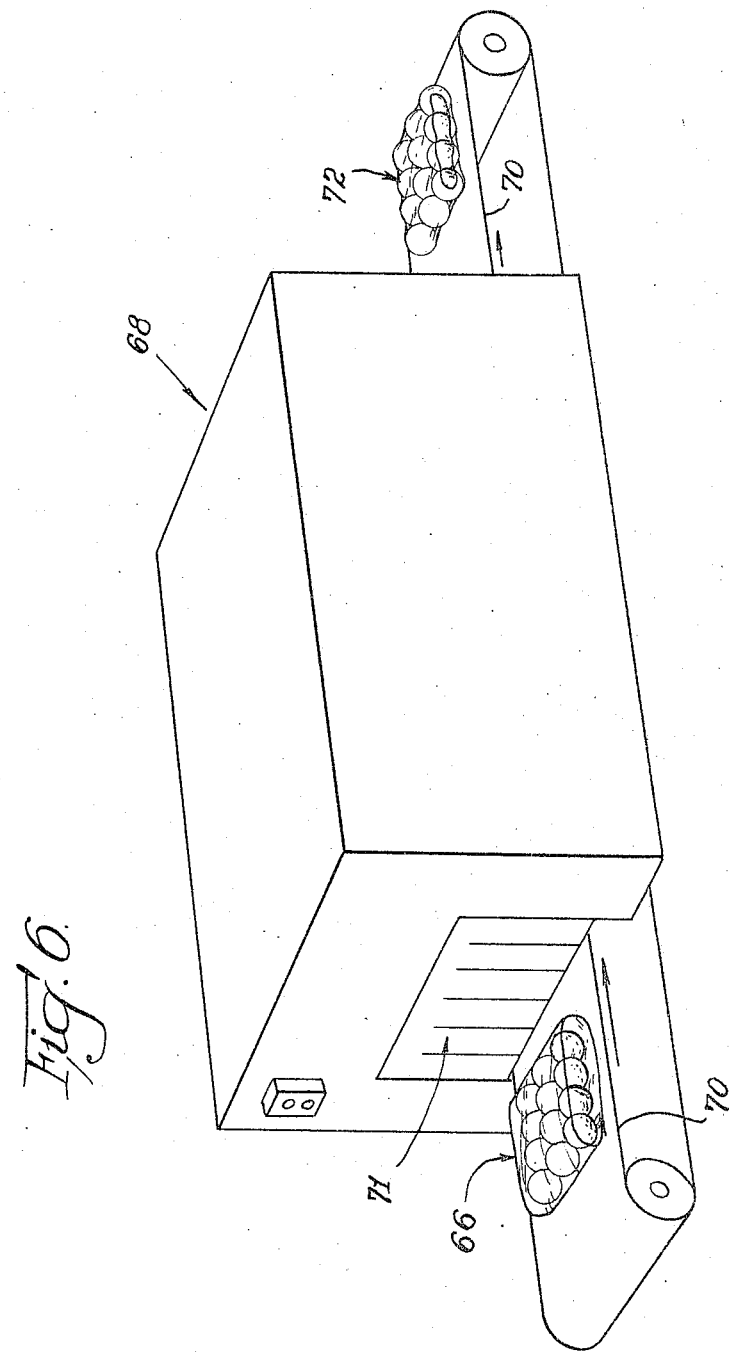

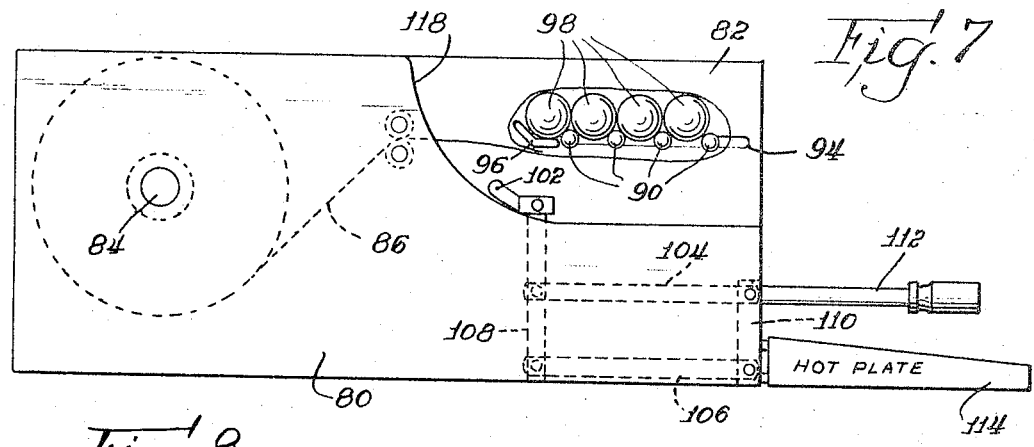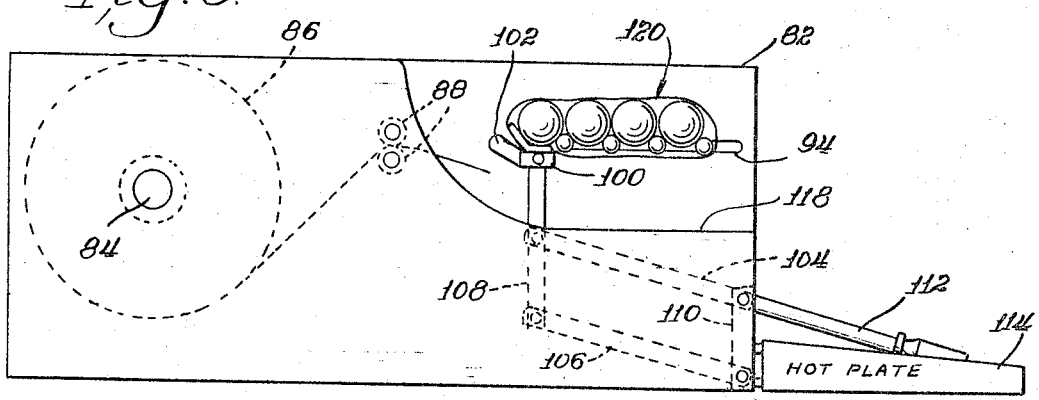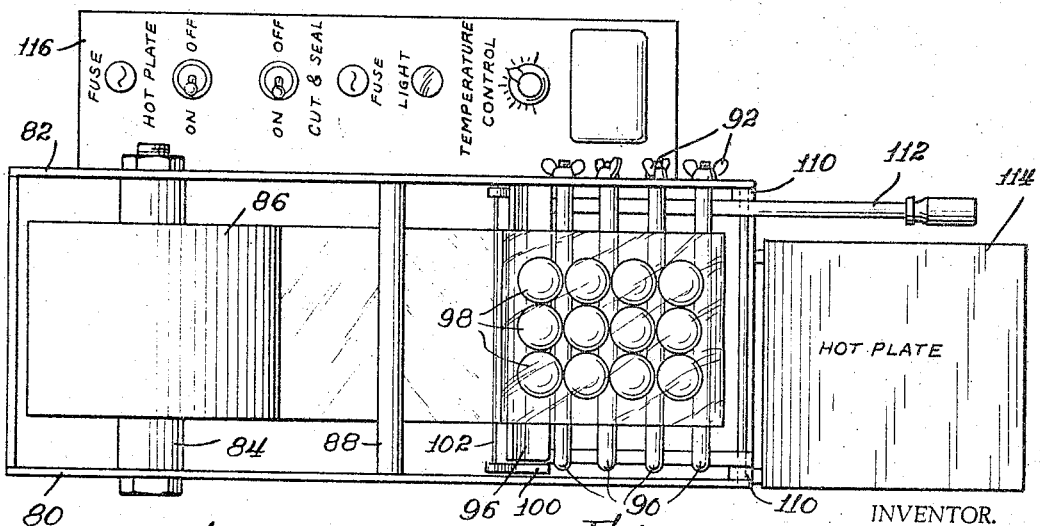

Oct. 24, 1967     E. G. CURTIS     3,348,356
METHOD OF COVERING A TRAYLESS PACKAGE WITH
HEAT SHRINKABLE PLASTIC FILM
Filed Nov. 13, 1963     5 Sheets-Sheet 5

INVENTOR.
Edward G. Curtis

United States Patent Office 3,348,356
Patented Oct. 24, 1967

3,348,356
METHOD OF COVERING A TRAYLESS PACKAGE WITH HEAT SHRINKABLE PLASTIC FILM
Edward G. Curtis, St. Petersburg Beach, Fla., assignor to The Dow Chemical Company, Midland, Mich., a corporation of Delaware
Filed Nov. 13, 1963, Ser. No. 324,174
14 Claims. (Cl. 53—30)

This invention relates to apparatus for fixing a sheet of heat shrinkable plastic film about a plurality of objects in preparation for heat shrinking the film about the objects to form a self-sustaining package.

This application is a continuation-in-part of my co-pending application Ser. No. 296,341 filed July 19, 1963, now abandoned.

The use of heat shrinkable film in package formation has become standard procedure in many business operations, and especially in the packaging of food products. The standard bander, or wrapper for in-store use requires a paper, or pulp tray to hold the produce being packaged, which leads to application of either of two methods:

(1) After the produce is placed in the tray, it is completely overwrapped with a heat sealable film, which is heat-sealed in place on the bander.

(2) After the produce is placed in the tray, it is wrapped with a heat-shrinkable plastic film, and then run through a heat tunnel which causes the film to shrink and tightly hold the produce in place.

In both of these methods it is necessary to utilize an extra part, namely, the paper, or pulp tray. The present invention eliminates the use of the tray and produces a wrapped package which is self-sustaining, and every bit as serviceable as packages made in accordance with either of the two methods outlined above. Substantial economies are thus made possible with the apparatus and method of the present invention, not only in saving on material cost, but in the reduction of handling and storage charges.

Two embodiments of the invention are disclosed, both of which utilize a heat shrinkable material, such as a polystyrene film, for example Trycite (a trademark of The Dow Chemical Company), and a platform for holding the produce (e.g., fruit, vegetables, etc.,) to be wrapped.

In a first of the embodiments, a roll of film is positioned so that it is in convenient position relative to a platform. The platform is formed of two finger assemblies which move horizontally in opposition so that when in full open position the space therebetween is greater than the width of the film. The produce is placed upon the platform when in closed position and the film drawn toward the operator under the platform and over the produce with an end of the film being tucked under the platform. A heated platen is then moved into engagement with the film, in the region of the tucked in portion, to form a seam across the width of the film. Simultaneous with the film seaming operation, a hot wire severs the film adjacent the seam. The platform is then opened and the operator places the open end package thus formed, upon an endless belt which passes through a heat tunnel to cause the film to tightly shrink upon the produce and form a trayless, self-sustaining package.

In a second embodiment, a platform is formed of a plurality of parallel spaced rods, all of which are fixedly mounted at one end for extension in a horizontal plane. The produce is placed upon the platform, and a sheet of film is drawn from a roll toward the operator, under the platform, and over the produce with an end of the film being tucked under the platform. A heated platen is then moved into engagement with the film, in the region of the tucked in portion, to form a heat seal across the width of the film, while a hot wire simultaneously severs the film, adjacent the seam. The operator then slips the open end package thus formed off of the platform and either places it upon a conveyor belt for passage through a heat shrink oven, or folds the unsealed ends over and places the package upon a hot plate for heat sealing the folded ends.

In a variation of the second embodiment, a plurality of rolls of film of different width, are arranged for selective use for wrapping the produce on the platform. In all other respects, the variation is identical with the second embodiment.

Any of the embodiments disclosed will provide a trayless package displaying the features and advantages afforded by application of the principles of the invention.

The main object of this invention is to reduce the cost of forming a heat shrinkable film package, and to provide savings in handling and storage costs in such type of package.

A more specific object is to provide apparatus and a method for forming a trayless, heat shrinkable, film covered, self-sustaining package.

Another object is to provide apparatus and method for forming a trayless, heat shrinkable film covered package which is serviceable and attractive.

Another object is to provide a heat sealable film wrapped package which can be quickly wrapped in a variety of film sizes, and readily sealed.

These and further objects and features of the invention will become more apparent from the following description and accompanying drawings wherein:

FIG. 1 is a plan view of apparatus embodying the principles of the invention;

FIG. 2 is an end view of the same;

FIG. 3 is a section view generally as seen along line 3—3 in FIG. 1;

FIG. 4 is a perspective-like view of a package formed with the apparatus of FIG. 1, and prior to a heat shrinking operation;

FIG. 5 is the same but showing the package after a heat shrinking operation;

FIG. 6 is a perspective-like view of a film heat shrink oven arrangement used for completing formation of a package made with the apparatus of FIG. 1;

FIG. 7 is a side view of another embodiment of the invention showing produce on a platform, after being looped by a sheet of film;

FIG. 8 is the same but showing a film heat sealing and severing operation;

FIG. 9 is a plan view of the apparatus of FIG. 7;

Figure 10:
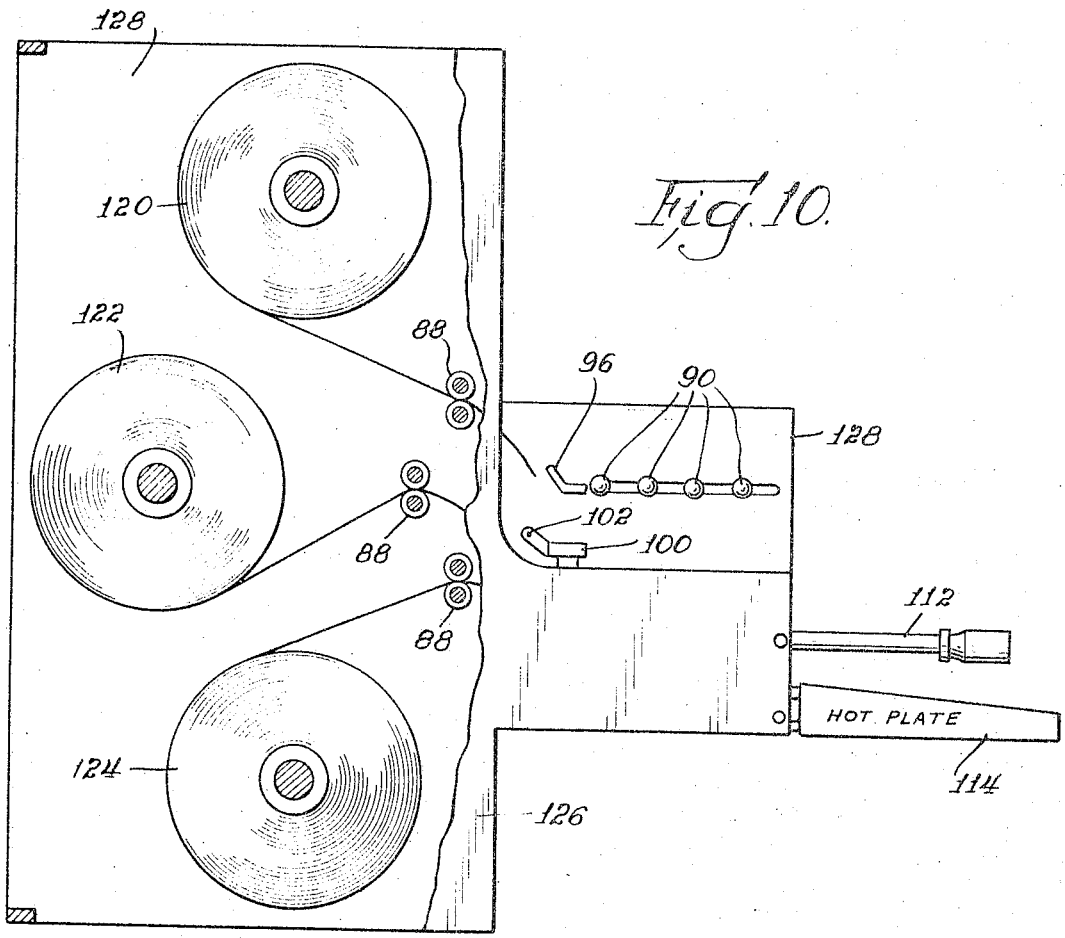
FIG. 10 is a side view of a variation of the apparatus of FIG. 7, showing usage of a plurality of rolls of film.

Referring now to the drawings, numeral 6 identifies a wrapping device illustrative of an embodiment of the invention, which includes a supporting frame, or stand having a plurality of legs 8, and pairs of side plates 10 and 12 supported by the legs. The side plates are maintained in fixed parallel relation by horizontal spacer bars 14.

As best seen in FIG. 3, a pair of rollers 16 is mounted in horizontal spaced relation in bearing means 18 secured to the side plates 12, which rollers support a roll 20 of plastic film material used in the wrapping operation to be more fully described hereinafter. A round bar 22 is positioned horizontally between the side plates 12 for guidingly supporting a sheet of film 23 taken from the roll 20 as it is passed between a pair of guide rollers 24. The rollers 24 are rotatably supported between the side plates 12, and are positioned to apply a slight pressure to the film 23 to keep it taut between the rollers 24 and the roll 20.

Each side plate 12 is apertured to slidingly receive a movable finger assembly 25 including a plurality (four shown) of fingers, or rods 26 which are arranged in horizontal spaced relation and are affixed at an outer end to a bar 28. Adjacent the rods 26, are abutment means in the form of angle bars 30, 31 slidingly supported in the side plate 12, and affixed to the bar 28. The latter is apertured to slide upon a pair of rods 32 horizontally supported between the side plates 10 and 12. A helical spring 34 is compressively arranged upon each rod 32 to urge the bar 28 toward the side plate 12.

As best seen in FIGS. 1 and 2, there are two finger assemblies 25 which move horizontally in opposition, and which are spaced a short distance apart when moved inwardly the maximum amount. When the finger assemblies are moved outwardly the maximum amount, the inner ends thereof will be spaced apart a greater distance than the width of the film 23.

Outward movement of each finger assembly is effected by means of a cable 36 which is guidingly supported upon a pulley 38 affixed to the side plate 10 so that one end of the cable is secured to the bar 28 while the other end is secured to a horizontally arranged cross-piece 40. A foot operated linkage mechanism is arranged for vertical movement of the cross-piece 40, which mechanism includes a third class lever 42 pivotally affixed at one end to the supporting frame and at the other end to a rod 44 suspended from mid-point of the cross-piece 40. A rod 46 is connected at one end to the lever 42 at the other end and to a foot operated lever 48, pivotally affixed at one end to the supporting frame, and having a foot pad 50 at the other end which extends beyond the legs 8. It will be seen that with a relatively slight depression of the foot pad 50, the finger assemblies 25 will be moved from maximum inward position to maximum outward position.

A film sealing and cutting means is provided which includes a heatable platen 52, movable vertically into engagement with the underside of the angle bar 30, and a hot wire 54 affixed to the platen 52, and arranged for movement past the plane of the film 23 when in maximum upward position. The platen 52 is supported upon a rod 56 which is journaled for vertical movement in the spacer bars 14, the lower end of the rod being pivotally affixed to one end of a lever 58 mounted upon the supporting frame and having a foot pad 60 affixed to the other end projecting beyond the legs 8. Electric circuit means (not shown) are provided for heating the platen 52 and wire 54, as required for film sealing and cutting. The film sealing and cutting means will be urged by gravity toward the lowermost vertical position, as seen in FIG. 3, where it will remain when not in use. By stepping down on the foot pad 60, the platen 52 and wire 54 will be moved upwardly to seal the film 23 and cut it, in a wrapping operation, as will now be described.

Assume it is desired to wrap produce, such as oranges, or apples 62, a given number, say one dozen, are placed upon the fingers 26 and angle bars 30, 31 of the finger assemblies 25, when the latter are in closed position, i.e., at maximum position of movement toward each other (FIG. 1). The film 23, forward of the guide rollers 24, that is, between said rollers and the hot wire 54, is grasped by the operator and pulled under the finger assemblies, then over the finger assemblies, and the lead end of the film is placed beneath the angle bar 30 to cause an overlap, as best seen in FIG. 3. The operator then steps on the foot pedal 60 which raises the heated platen 52 so that it moves the overlapped film into engagement with the angle bar 30, thereby forming a longitudinal seam 64 extending the width of the film 23; simultaneously with such seam formation, the hot wire 54 will sever the film forward of the guide rollers 24. Upon release of pressure on the foot pedal 60, the heated platen will descend into non-operative position. A package 66, having unshrunk film, is then formed (FIG. 4).

The operator then steps on the foot pedal 50 which results in movement of the finger assemblies 25 away from each other, causing a withdrawal of the fingers 26 and angle bars 30, 31 from the package. During such withdrawal movement of the finger assemblies 25, the operator places his hand beneath the package 66 to receive the package when released from support by the finger assemblies.

The package 66 is then passed through a film heat shrinking means, such as the heat tunnel, or oven 68 shown in FIG. 6. The oven has an atmosphere which is maintained at a temperature sufficient to cause the desired heat shrinking of the film 23. The oven may be gas, or electrically heated, and may have a flap-panel door 71 at both the entrance and exit which allows movement of the packages in and out of the oven, while still sealing the oven against loss of heat when the door is in closed condition. An endless conveyor belt 70 is arranged for continuous movement through the oven. The package 66 is placed upon the belt; upon the emergence from the oven the film will be tightly shrunk upon the produce to form a self-sustaining package 72, as best seen in FIG. 5. During shrinkage, the open ends of the package 66 will shrink and contract about the produce, thus effectively sealing the produce within the package 72.

A second embodiment of the invention shown in FIGS. 7 to 9, includes side plates 80 and 82 which are fixedly maintained in vertical parallel relation by spacer rods or plates (not shown). A shaft 84 is supported between the side plates for positionally holding a roll of heat shrinkable film 86. The film 86 is passed through a pair of pressure rolls 88 rotatably supported between the side plates 80 and 82, and beneath a horizontal platform which includes a plurality of fingers, or rods 90 which are removably secured, as by using wing nuts 92, to the side plate 82. The mounted ends of the fingers 90 may be arranged in a slot 94 formed in the side plate 82 so that the relative spacing between the rods may be adjusted to accommodate different size produce. An angle bar 96 is positioned adjacent an end finger 90 and parallel therewith, which bar serves the two-fold purpose of positionally supporting an end row of produce, such as apples 98, as well as serving as an abutment means for a film sealing operation, as will be more apparent hereinafter. The angle bar 96 is mounted upon the side wall 82.

A film sealing and cutting means is provided which includes a heatable platen 100, movable vertically into engagement with the underside of the angle bar 96, and a hot wire 102 affixed to the platen 100, and arranged for movement past the plane of the film 86 when in maximum upward position. The platen 100 and hot wire 102 are supported upon a parallelogram-type of linkage including generally horizontal rods, or arms 104, 106, and vertical rods, or arms 108, 110. The rod 110 is stationary and rods 104 and 106 are pivoted thereto, as well as being pivoted to the rod 108. A handle extension 112 is operable for moving the linkage so that the platen 100 is brought into abutment with the angle bar 96. A hot plate 114 is arranged for final sealing operation on a package, if such type sealing is required. A control console 116, which houses all the circuitry and control elements as required for operation of the apparatus, may be arranged adjacent the side wall 82. The side plate 80 is formed with a cut-out portion 118 to provide clearance for an unfinished package being removed from the platform.

The operation of the apparatus above described, is as follows. Produce 98, or other items to be packaged, are placed upon the platform fingers 90 and the film 86 is drawn below the platform, up over the produce 98, and tucked in between the angle bar 96 and film as shown in FIG. 1. It may be mentioned that the film width is substantially wider than the assembled produce. The handle extension 112 is then pushed downwardly, causing the heated platen to engage the film and cause a heat seal to be made between the body of the film, and the tucked-in portion, along the width of the film. Simultaneous with such heat sealing, the hot wire 102 will sever the film thus completing the formation of an open sided package 120, as seen in FIG. 8.

The package 120 is then slipped off the platform; clearance for such movement is provided by the side plate cut-out 118. Upon such disengagement, the free open ends of the package may be folded over on the bottom of the package, following which the package is placed on the hot plate 114 to seal the folded over ends. In the alternative, the package after removal from the platform, may be placed upon the conveyor belt 70 for passage through the heat tunnel 68 to cause a shrinking of the open ends to provide a package similar to package 72, previously described.

Figure 11:
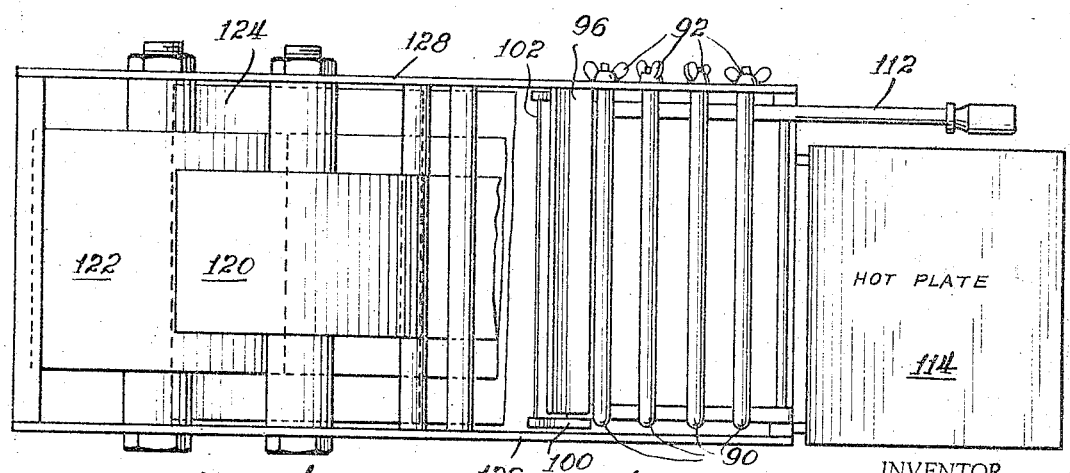
FIG. 11 is a plan view of the apparatus of FIG. 10.

A variation of the second embodiment is shown in FIGS. 10 and 11, and only so much as is different will be described. The apparatus seen in FIGS. 10 and 11, is arranged to accommodate a plurality of different width rolls of films 120, 122 and 124, which may be selectively utilized in packaging operations. Side frames 126 and 128 are fashioned to accommodate the rolls of films. The operator then has a selection of different width films so that packages of different size may be conveniently formed. In all other respects, the function of the variation of the second embodiment is the same as that above described, and similar numerals are utilized to identify the equivalent parts.

It will be seen that the apparatus and method for wrapping objects in preparation for heat shrinking of the wrapper, or for package sealing as above described, will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. Apparatus for fixing a loop of heat shrinkable plastic film about one or more objects comprising in combination, means to hold a roll of plastic film in position for unrolling a predetermined amount of film therefrom, an object holding platform including two finger assemblies movable in opposition, means to form a heat seal upon film looped about the platform, and means to sever the film.

2. Apparatus for fixing a loop of heat shrinkable plastic film about one or more objects comprising in combination, means to hold a roll of plastic film in position for unrolling a predetermined amount of film therefrom, an object holding platform including two finger assemblies movable in opposition a distance apart substantially equal to the width of the film, means to form a heat seal upon film looped about the platform, and means to sever the film.

3. Apparatus for fixing a loop of heat shrinkable plastic film about one or more objects comprising in combination, parallel rollers arranged for support of a roll of plastic film in position for unrolling a predetermined amount of film therefrom, an object holding platform including two finger assemblies horizontally movable in opposition a distance apart substantially equal to the width of the film, a heatable platen movable into abutment with the platform for sealing the looped film along the width thereof, and a heatable means for severing the film.

4. Apparatus for fixing a loop of heat shrinkable plastic film about one or more objects comprising in combination, parallel rollers arranged for support of a roll of plastic film in position for unrolling a predetermined amount of film therefrom, an object holding platform including two finger assemblies horizontally movable in opposition a distance apart equal to the width of the film, a heatable platen movable into abutment with the platform for sealing the looped film along the width thereof, and a heatable wire movable simultaneously with said platen for severing the film after it has been sealed.

5. Apparatus for fixing a loop of heat shrinkable plastic film about one or more objects comprising in combination, parallel rollers arranged for support of a roll of plastic film in position for unrolling a predetermined amount of film therefrom, an object holding platform including a pair of finger assemblies horizontally movable in opposition, each of said finger assemblies having an equal number of parallel arranged fingers and an angle bar adjacent an edge disposed finger, a heatable platen movable into abutment with the angle bar of each finger assembly to heat seal the looped film along the width thereof, a heatable wire movable simultaneously with said platen for severing the film after it has been sealed, and means to move the finger assemblies apart a distance at least equal to the width of the film.

6. Apparatus for fixing a loop of heat shrinkable plastic film about one or more objects comprising in combination, a pair of horizontally arranged parallel rollers for support of a roll of plastic film in position for unrolling a predetermined amount of film therefrom, an object holding platform including a pair of finger assemblies horizontally movable in opposition, each of said finger assemblies having an equal number of parallel arranged fingers and an angle bar adjacent an edge disposed finger, the fingers and angle bar of each finger assembly being in alignment, a heatable platen movable into abutment with the angle bar of each finger assembly to heat seal the looped film along the width thereof, a heatable wire supported by said platen and of length greater than the width of the film, said wire being arranged for severing the film after the seal has been made by the platen, and means to move the finger assemblies apart a distance at least equal to the width of the film.

7. Apparatus for fixing a loop of heat shrinkable plastic film about one or more objects comprising in combination, a pair of horizontally arranged parallel rollers for support of a roll of plastic film in position for unrolling a predetermined amount of film therefrom, an object holding platform including a pair of finger assemblies horizontally movable in opposition, each of said finger assemblies having an equal number of parallel arranged fingers and an angle bar adjacent an edge disposed finger, the fingers and angle bar of each finger assembly being in alignment, resilient means to constantly urge the finger assemblies together, a manually operable means to move the finger assemblies apart a distance at least equal to the width of the film, a heatable platen movable into abutment with the angle bar of each finger assembly to heat seal the looped film along the width thereof, a heatable wire supported by said platen and of length greater than the width of the film, said wire being arranged for severing the film after the seal has been made by the platen, and manually operable means to move the platen into film sealing position.

8. Apparatus according to claim 7, wherein said manually operable means for moving the platform finger assemblies apart includes a cable affixed at one end to each of the finger assemblies, the other end of the cable being attached to a cross piece, and a foot operated linkage arrangement for moving the cross piece.

9. Apparatus according to claim 7, wherein said manually operable means for moving the platen into sealing position includes a rod upon which the platen is supported, and a foot operated lever arrangement for moving said rod.

10. A method of forming a trayless package having a heat shrinkable plastic film covering including the steps of, placing the object to be packaged upon a platform, drawing a sheet of plastic film from a roll and guiding the film beneath the platform then over the object and finally tucking the lead end of the film between the platform and the sheet of film, heat sealing the film along a line in the region of the tucked in portion, severing the film along the sealed portion, and removing the wrapped object from the platform by causing a relative movement between the wrapped object and the platform in the direction of the width of the film, passing the wrapped object through a heated tunnel to cause shrinkage of the film into tight engagement with said object.

11. A method of forming a trayless package having a heat shrinkable plastic film covering including the steps of, placing the object to be packaged upon a platform having an angle bar edge, drawing a sheet of plastic film from a roll and guiding the film beneath the platform then over the object and the platform and finally tucking the lead end of the film between the platform angle bar edge and the sheet of film, moving a heat sealing platen into abutment with the angle bar edge to heat seal the film together along the width thereof, moving a hot wire to sever the film along the region of the heat seal, and moving the platform so as to remove the package therefrom.

12. A method of forming a trayless shrinkable film covered package upon a platform having symmetrically disposed halves movable in opposition comprising the steps of, placing the platform halves in horizontal end to end position, placing one or more objects on the juxtaposed platform halves, drawing a sheet of plastic film from a roll and guiding the film beneath the platform halves, then over the objects and finally tucking the free end of the film between the platform halves and the film, moving a heat sealing platen into abutment with the film to form a heat seal along the tucked in portion, moving a hot wire to sever the film along the region of the heat seal, and moving the platform halves apart so as to disengage the package therefrom.

13. A method of forming a trayless shrinkable package according to claim 12, including the step of taking the package removed from the platform and passing it through a heated tunnel to cause shrinkage of the film into tight engagement with the object covered thereby.

14. A method of forming a trayless package having a heat sealable plastic film covering including the steps of placing the object to be packaged upon a platform, drawing a sheet of plastic film from a roll and guiding the film beneath the platform then over the object and finally tucking the lead end of the film between the platform and the sheet of film, heat sealing the film along a line in the region of the tucked in portion, severing the film from the roll along the sealed portion, removing the wrapped object from the platform by a sliding movement, folding under the free ends of the wrapped package, and placing the package upon a hot plate to seal the folded under portions to the bottom of the package.

References Cited

UNITED STATES PATENTS

| | | | |
|---|---|---|---|
| 2,528,463 | 10/1950 | Whetzell | 53—255 |
| 2,668,403 | 2/1954 | Rumsey | 53—184 X |
| 2,690,633 | 10/1954 | Denton | 53—33 X |
| 2,889,672 | 6/1959 | Anderson | 53—33 |
| 2,957,386 | 10/1960 | Heller | 53—255 X |
| 3,021,656 | 2/1962 | De Vries | 53—260 |
| 3,111,221 | 11/1963 | Chapman et al. | 53—48 X |
| 3,172,246 | 3/1965 | Ruff | 53—198 |

FOREIGN PATENTS 431,079 7/1926 Germany.

TRAVIS S. McGEHEE, *Primary Examiner.*

FRANK E. BAILEY, *Examiner.*

N. ABRAMS, S. A. BEND, *Assistant Examiners.*